United States Patent [19]

Gorman, II

[11] 3,997,736
[45] Dec. 14, 1976

[54] PARALLEL CONTROL OF A TELEPHONE SWITCHING NETWORK

[75] Inventor: Patrick Henry Gorman, II, Little Silver, N.J.

[73] Assignee: Bell Telephone Laboratories, Incorporated, Murray Hill, N.J.

[22] Filed: Jan. 16, 1976

[21] Appl. No.: 649,749

[52] U.S. Cl. .......................................... 179/18 C
[51] Int. Cl.² ...................................... H04M 11/00
[58] Field of Search ................................ 179/18 C

[56] References Cited
UNITED STATES PATENTS

3,335,226  8/1967  Michael et al. .............. 179/18 C X

Primary Examiner—William C. Cooper
Attorney, Agent, or Firm—David H. Tannenbaum

[57] ABSTRACT

A switching system is disclosed for interconnecting both the audio and wideband communication leads of communicating telephone stations. The system utilizes an auxiliary switching network separate from the regular audio network for handling the wideband portion of each interconnection. The connections through the auxiliary network are identified for control purposes by tracer signals applied to a called line and detected on the calling line. The tracer signals are applied and detected without interfering with the regular switching network and without major modifications to the existing network.

10 Claims, 6 Drawing Figures

PARALLEL CONTROL OF A TELEPHONE SWITCHING NETWORK

FIELD OF THE INVENTION

This invention relates to wideband telephone switching systems and more particularly to an arrangement for controlling wideband connections between communicating stations.

BACKGROUND OF THE INVENTION

Of increasing importance in business telephone communications is the ability to establish switched wideband connections between communicating stations. An example of such a requirement is the interconnection of both the audio and wideband portions of video communication connections. While such connections would seem at first thought to be made easily by merely adding extra communication leads to the existing switching network, such is not the case.

The problem is manyfold but in essence breaks down to the fact that the wideband portion of a connection carries communication signals sufficiently higher in frequency than conventional audio signals. These higher frequency signals cause interference unless special precautions are taken. In addition, since all stations may not be equipped with wideband facilities, it is usually uneconomical to expand the entire switching network to handle the additional communication bands necessary for wideband calls when only a relatively few stations are equipped for wideband service.

Further compounding the problem is the fact that it is not feasible to abandon existing telephone switching networks and thus, in order to effect new services, these new services must be controlled in a manner which allows them to be grafted to the existing facilities.

Thus it is an object of my invention to provide a switching network capable of handling the wideband portion of telephone interconnections without requiring modification to the existing switching network structure and without requiring complex control circuitry.

It is also an object of my invention to provide an expandable wideband switching network for use in conjunction with a conventional switching network whereby any telephone line can be equipped for wideband service.

SUMMARY OF THE INVENTION

These and other objects and advantages of my invention have been achieved in an embodiment wherein an auxiliary switching network separate from the regular switching network is used to handle the wideband portion of each calling connection. The wideband switch operates and is controlled completely independently from the operation and control of the regular switching network and not as a slave to the existing switchng network.

The embodiment shown is a key telephone system having a line circuit interposed in the tip and ring communication pair between each station and the central switching machine.

A station user desiring to initiate a wideband call goes off-hook and, after receiving dial tone from the PBX or CO switching machine, indicates by operation of a special button that the call is to be a wideband call. The wideband request is detected in the associated line circuit and the identity of the calling station is recorded by the associated line buffer circuit. The station user then dials the called station number and the PBX switching machine operates to establish a connection to the called station in the normal manner. When ringing is applied to the called line circuit, ringing is inhibited at the called station and a special tone is placed on the called line. The tone is transmitted back through the PBX switching machine and appears on the communication leads of the calling line. By detecting the tone, the wideband control circuit associates the called line with the calling line and thereby establishes a wideband connection through the auxiliary wideband switch from the wideband units associated with the called and calling lines. When this connection is established, ringing is applied to the called station. Thus, the association between the called and the calling line is made entirely independent of the PBX switching machine, and requires no modification to the central switching network.

Accordingly, it is one feature of my invention that connections are established through an auxiliary network under control of circuitry independent from the circuitry which controls the connection through the main switching network.

It is a further feature of my invention that an independent switching network is utilized to establish the wideband portion of calling connections under control of signals generated by a called station and transmitted through the regular switching network over the audio pair which signals are detected by the calling station.

BRIEF DESCRIPTION OF THE DRAWING

The principles of the invention as well as additional objects and features thereof will be appreciated from the illustrative embodiment shown in the drawing in which.

GENERAL DESCRIPTION

Figure 1:
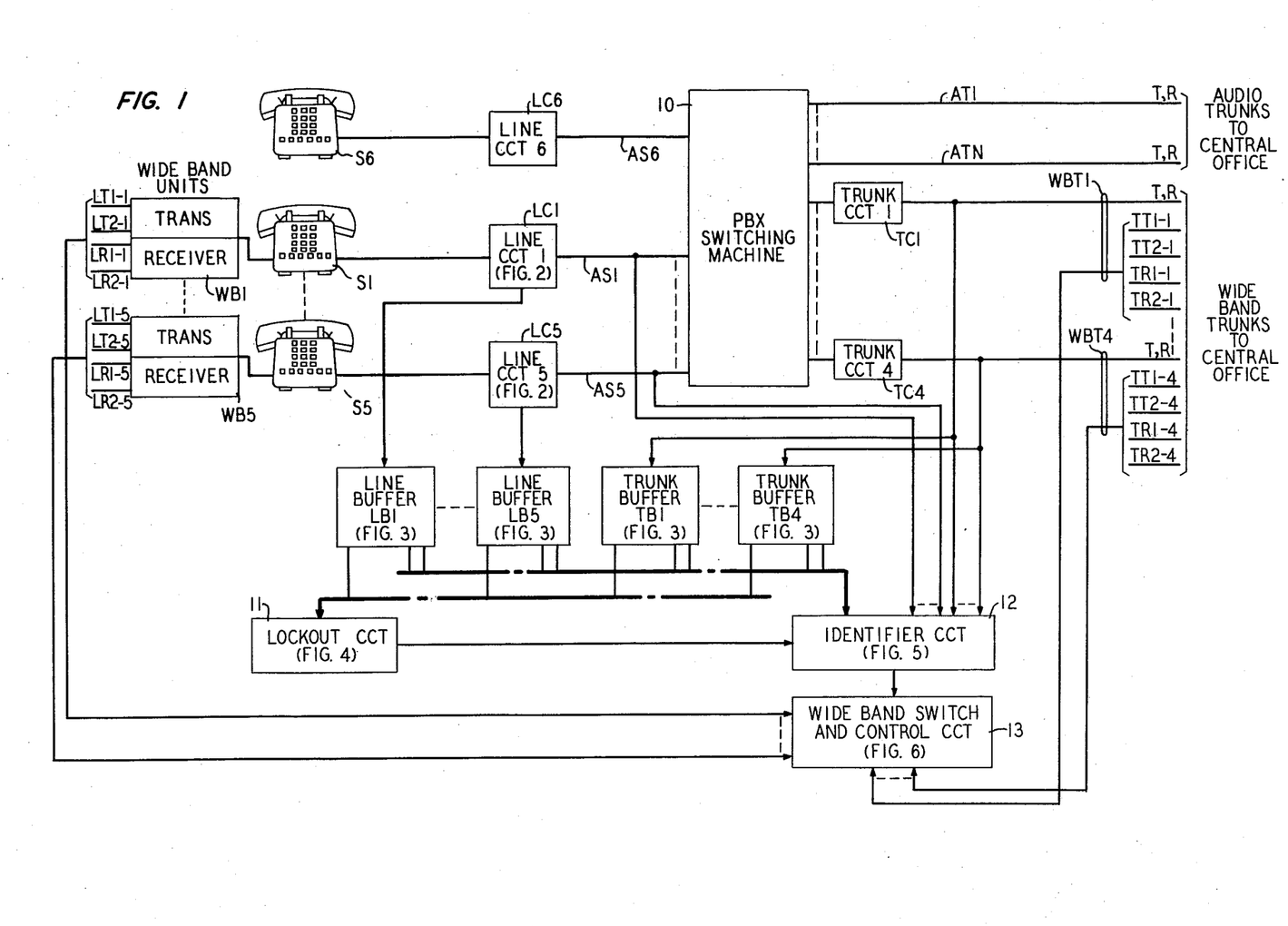
FIG. 1 is a block diagram showing the interrelationship of the particular elements of my invention.

As shown in FIG. 1 PBX switching machine 10 is arranged in any of the well known configurations operable to establish communication connections between various terminations under control of switching information provided thereto. It should be understood that any of a number of different types of switching machines, for example, electromechanic, electronic or any other type of switching machine may be utilized, and the switchng machine may be located on a subscriber's premises and operate as a PBX or the switching machine may be located at a central point and operate as a central office. In either event, certain incoming trunks shown in FIG. 1 as trunks AT1 to ATN communicate only audio information from a distant point to PBX switching machine 10. Wideband trunks WBT1 through WBT4 are utilized for communicating both audio and wideband information to the PBX switching machine 10. Lines AS1 through AS6 are used for communicating audio information from PBX switching machine 10 to the associated stations S1 through S6 via associated line circuits LC1 through LC6. In addition, associated with stations S1 through S5 are wideband units WB1 through WB5 each having wideband quad communication line associated therewith. It is the wideband quad associated with a calling one of the stations which must be interconnected with the wideband quad associated with a called one of the stations in order to establish a full wideband communication line. The interconnections between the wideband quads is controlled by wideband switch and control circuit 13 under control of identifier circuit 12, which circuit in turn operates from information provided by line buffers operates through LB5 and trunk buffers TB1 through TB4.

When a calling station, such as station S1 desires to place a wideband call, a special key is operated which transmits a signal to the associated line circuit and line buffer. The calling connection is then established in the well known fashion under control of called station identification signals transmitted from the calling station. The central switching machine then operates to establish a path through the switching network to the called station and ringing signals are applied to the called line. At this point the line buffer associated with the called line oprates to inhibit ringing at the called station and at the same time applies a distinctive tone signal to the communication leads of the called line. This tone is transmitted back through the central switching machine and appears on the calling line via the connection established through the switching network. When the tone is detected two line buffer circuits have been identified, namely, the line buffer circuit associated with the called line and the line buffer circuit associated with the calling line. Each of these line buffer circuits is uniquely associated with a particular horizontal and vertical of the auxiliary switching network and thus by identifying two points of the matrix a connection through the auxiliary network can now be made. This connection through the auxiliary network serves to interconnect the wideband units of the calling and called stations. When the wideband connection has been accomplished the line buffer circuit removes the ringing inhibiter and allows the called station to receive the ringing and lamp signals indicative of an incoming call connection.

In the situation where the incoming call was placed from a distant station, the call is incoming to the central switching machine over a wideband trunk circuit. Under this condition one of the trunk buffer circuits responds to the special tone and a wideband connection is established through the auxiliary network in the same manner as described above. In the situation where the call is placed to a distant station, the associated trunk buffer circuit causes the distinctive tone signal to be applied to the communication leads of the trunk and then be detected on the calling line. The wideband connection is then established.

It should be pointed out that each of the line circuits may be associated with more than one telephone station; and in which case, provision must be made so that only one of the associated stations has wideband access to the wideband switching control circuit 13, while the other stations associated with the same line circuit may all have concurrent audio connection to PBX switching machine 10. An example of such an arrangement is shown in U.S. Pat. No. 3,684,833 issued to S. E. Bush et al on Aug. 15, 1972.

DETAILED DESCRIPTION

Figure 2:
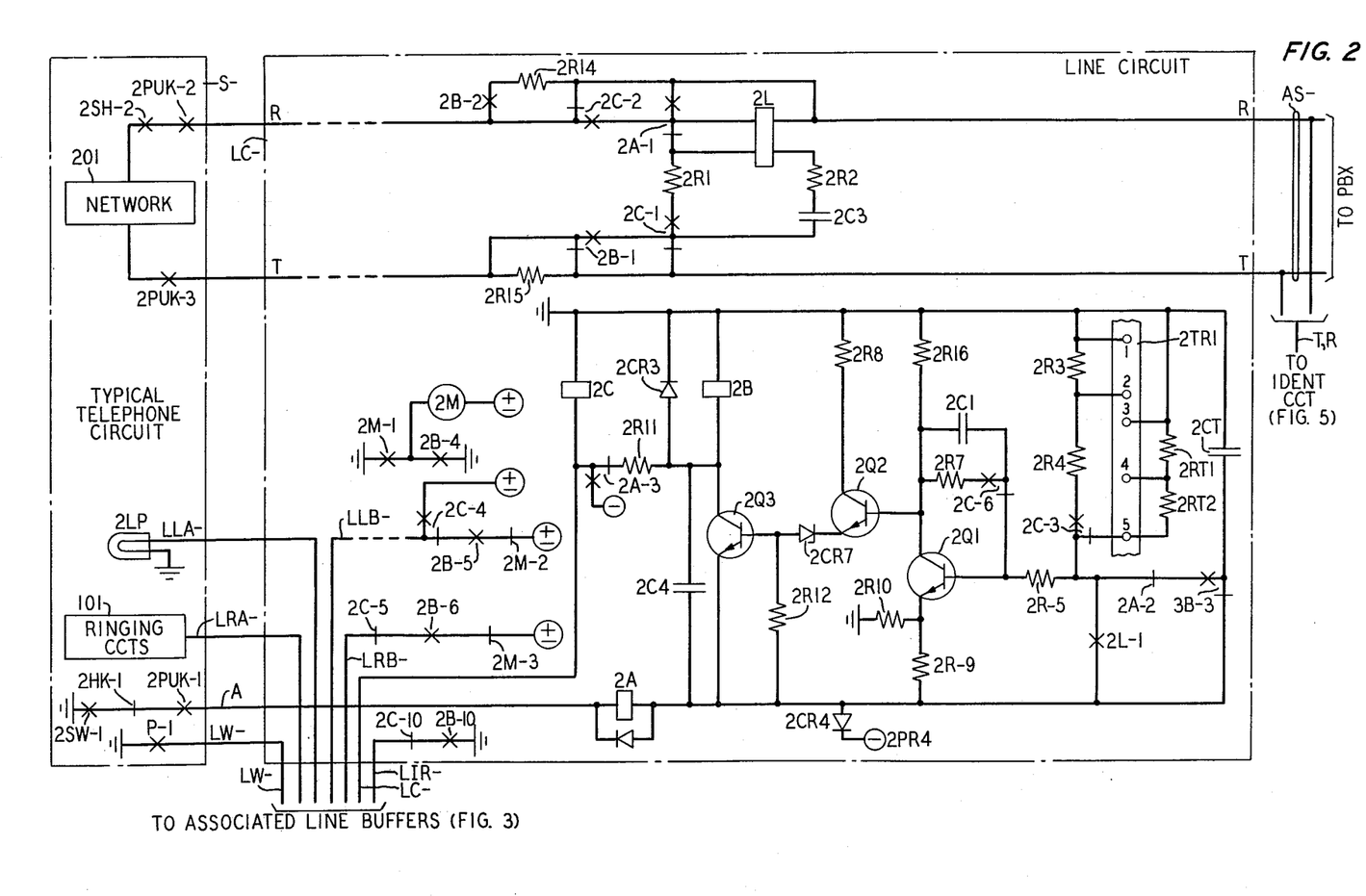
FIG. 2 through FIG. 6 show the circuit details in schematic form of the elements shown in FIG. 1.

The line circuit shown in FIG. 2 is representative of all the line circuits in this embodiment and operates in a well known fashion as detailed in U.S. Pat. No. 3,840,710 issued to A. D. Limiero. As discussed in the Limiero patent, relays 2A and 2C are operated when the line circuit is in the off-hook active mode, relay 2B is operated when the line circuit is in the ringing mode and relay 2C and 2B are operated when the line circuit is in the hold mode.

For purposes of discussion let us assume now that station S1 desires to establish both an audio and wideband communication link with station S5. Accordingly, station S1 goes off-hook thereby connecting network 201 across the T and R leads of the associated line circuit. Upon going off-hook ground supplied on lead A operates relay 2A in the associated line circuit. At the same time, since this is to be wideband call, key P, which key can be any type of key (including a key on the push button dial) adapted to provide a unique signal, is operated placing a ground on lead LW which ground is extended from station S1 and via the line circuit to the line buffer associated with station S1, which is line buffer LB1, shown in FIG. 3. Relay 2A operating causes the operation of relay 2C thereby placing the line circuit in the off-hook active condition which in turn extends lamp operating potential via enabled make contact 2C-4 and lead LLB- which potential instead of being communicated directly to the line lamp of the associated station as would occur if the line circuit was not adapted for wideband service is directed to the associated line buffer (FIG. 3) over lead LLB1. Accordingly, the line lamp at station S1 remains off until either relay LG1 or relay LCA1 operates.

Figure 3:
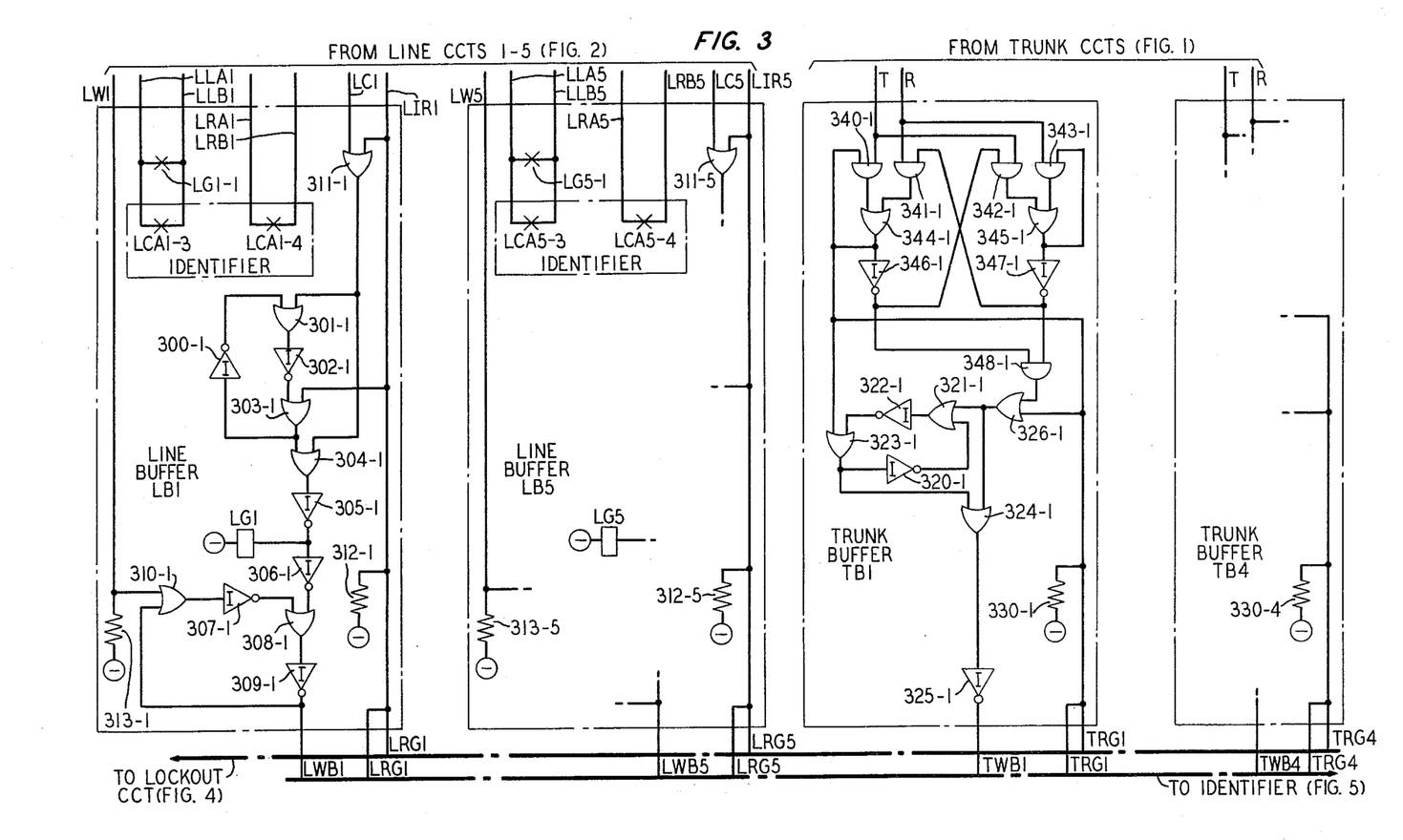

When relay 2A operates in the line circuit, negative potential is provided via enabled make contact 2A-3 over lead LC1 to line buffer LB1. This negative potential (battery) is provided to one input of gate 311-1. Since relay 2C is operated in the line circuit, lead LIR1 has battery thereon and since both inputs of OR gate 311-1 are at negative potential the output goes negative thereby providing a negative to one input of gate 304-1. The other input of gate 304-1 is also negative at this time. Accordingly, the output of gate 304-1 goes negative causing the output of gate 305-1 to go to ground thereby operating relay LG1. Relay LG1 operating extends the lamp operating potential from lead LLB1 through make contact LG1-1 and over lead LLA1 to the calling station S1 to operate the associated line lamp.

The ground at gate 305-1 is also provided to the input of gate 306-1 causing the output of that gate to go negative which in turn provides a negative to one input of gate 308-1. Since this is a wideband call a ground is on lead LW1 causing the output of gate 310-1 to be at ground and the output of gate 307-1 to be negative. Accordingly, since both inputs to gate 308-1 are negative the output of that gate goes negative causing the output of gate 309-1 to go to ground. This ground is communicated via lead LWB1, to identifier 12 shown in FIG. 5 to one input of gate 56-1 thereby preparing that gate for operation if the other input subsequently has ground supplied thereto. The purpose for preparing gate 56-1 at this time is that station S1 is a calling station and relay LZ1 controls the wideband switching network with respect to station S1 as will become more fully apparent from that which is contained hereinafter. All calling stations are marked for subsequent identification as a fail/safe mechanism to insure that connections are never completed to idle stations.

At this point line buffer LB1 associated with calling station S1 has been activated and relay LZ1 in identifier 12 associated with station S1 has been identified for possible subsequent operation. Nothing further takes place with respect to the identified calling station in either the line buffer or the identifier until the call is completed through the switching network.

Establishment of a Calling Connection

Station S1, by transmitting station identification digits over the T and R leads to the PBX switching machine, causes the PBX switching machine to establish a connection therethrough to the line circuit associated with the called station, which we have assumed to be line circuit LC5, FIG. 1, PBX 10 operates in the well known manner to establish an audio communication connection from station S1 to station S5 and upon completing the connection causes ringing signals to be applied to the T and R communication leads of the called station. Upon receipt of these ringing signals relay 2L operates in the line circuit associated with called station S5. Relay 2L operating enables the operation of relay 2B. The line circuit goes into the ringing mode with interrupter 2M being turned on via enabled make contact 2B-4, thereby providing a source of flashing potential via pulsating contacts 2M-2 and 2M-3. This flashing potential is extended via enabled make contact 2B-5 and released break contact 2C-4 over lad LLB5 to the line buffer associated with station S5 which in this case is line buffer LB5 shown in FIG. 3. Since neither the LG5 relay in line buffer LB5 nor the LCA5 relay in the identifier is operated, the flashing voltage is inhibited from being extended to the line lamp associated with called stations S5.

When the line circuit (FIG. 2) goes into the ringing mode, a source of ringing potential is extended via enabled make contact 2B-6 and released break contact 2C-5 over lad LRB5 to the associated line buffer LB5 shown in FIG. 3. Again, since relay LCA5 is not operated, ringing potential is inhibited from being extended over lead LRA5 to ringing circuit 101 of the called station S5. Thus, while a called connection has been established from line circuit LC1 through the PBX switching machine to line circuit LC5, the line lamp and the ringer at the called station S5 remain unoperated. The purpose for inhibiting audible and visual ringing signals is to insure that the line circuit remains in the ringing state until an identification is made in the auxiliary switching network of the called and calling stations so that the wideband unit associated with station S1 may be connected to the wideband unit associated with station S5.

Continuing in FIG. 2, when relay 2B operates, ground is extended via enabled make contact 2B-10 and released break contact 2C-10 over lead LIR5 to the associated line buffer LB5 shown in FIG. 3. This ground is extended via lead LRG5 to both the lockout circuit FIG. 4 and the identifier circuit FIG. 5. The ground on lead LRG5 to lockout circuit 11, FIG. 4 serves to operate the associated relay LL5 and, assuming no other line buffers are activated, relay LA5 also operates. Relay A is thereby operated via enabled make contact LA5-1. Relay A operates relay CO via enabled make contact A-1 which relay in turn prevents the operation of any other LA- or TA- relays.

Operation of Lockout Circuit

Figure 4:
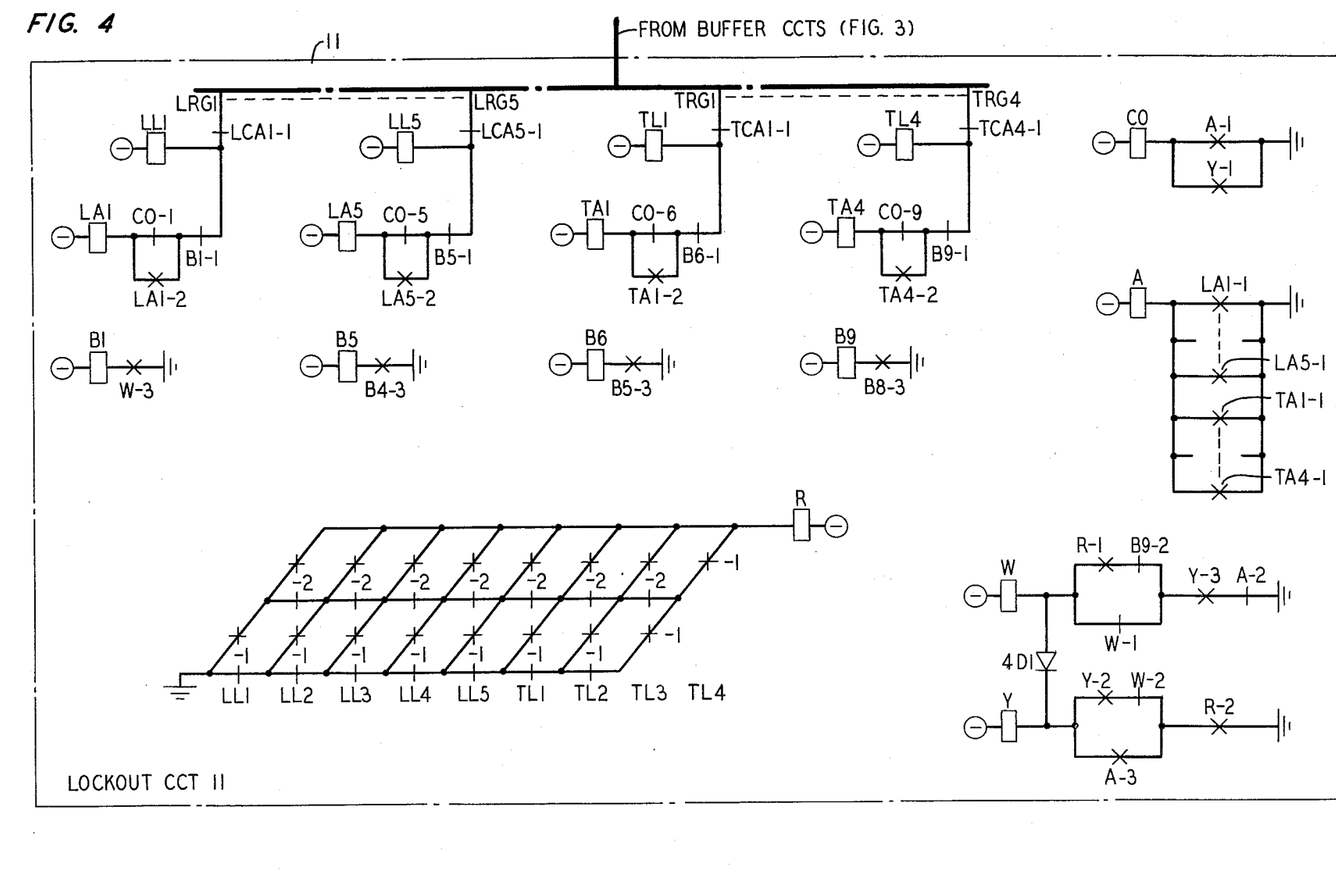

Before progressing further the operation of lockout circuit 11 will be explained in detail. As above stated assuming that a ground appears on lead LRG5 (station S5 becoming identified as a called station), relays LL5 and LA5 operate. Relay LA5 locks operated via enabled make contact LA5-2 and released break contact B5-1.

Let us now further assume that ringing is detected on two other line circuits at this same time. For discussion purposes we shall assume that these other line circuits are associated with station S1 and with trunk TC1. Accordingly, grounds would appear on leads LRG1 and TRG1, respectively, thereby operating relays LL1 and TL1. When multiple LL- and/or TL- relays are operated, relay R operates from ground extended via enabled make contacts LL1-1 and LL5-2. Ground is then extended via enabled make contacts R-2 and A-3 to operate relay Y. The operation of relay Y provides an alternate operating path for relay CO via enabled make contact Y-1. Assume now that line circuit LL5 goes from the ringing state to either the active state or to the inactive state, or that relay LCA5-1 operates thus indicating that both the calling and called lines on a given connection have been identified, as will be explained later, the ground on lead LRG5 is removed and relays LL5 and LA5 release. However, since relays LL1 and TL1 are still both operated, relay R remains operated via enabled make contact LL1-1 and TL1-2. Relay LA5 releasing causes the release of relay A. However, relay CO remains operated at this time via enabled make contact Y-1. Relay Y remains operated via ground through enabled make contact R-2, released break contact W-2 and enabled make contact Y-2.

When relay A releases, ground is extended via released break contact A-2, enabled make contact Y-3 and released break contact W-1 to operate relay W and to maintain relay Y operated via forward biased diode 4D1. Relay W remains operated via ground through enabled make contacts R-1 and Y-3, and released break contact B9-2 and A-2. Relay W operating provides ground via enabled make contact W-3 to operate relay B1. Relay B1 operating provides ground via enabled make contact B1-1 (not shown) to operate relay B2. This sequence continues until all relays B1 through B9 are operated and held operated. When relay B9 operates, ground is removed from the coil of relay W via enabled break contact B9-2 causing both the W and Y relays to release. At this time relay CO releases. When relay W releases, relay B1 releases thereby allowing the operation of relay LA1 from ground which has been assumed to be on lead LRG1. Relay LA1 reoperates relay A through enabled make contact LA1-1 thereby reoperating relay CO. Relay Y then reoperates through reenabled make contact A-3 and enabled contact R-2. The operation of relay CO prevents the operation of any other LA- or TA- relays.

When line circuit LC1 goes from the ringing state to either the inactive or to the active state or relay contact LCA1-1 operates, ground is removed from lead LRG1 causing the release of relays LL1, LA1, and A. Assuming that only the TL1 relay remains operated, relay R also releases thereby releasing relay Y which in turn releases relay CO. Accordingly, relay TA1 is free to operate immediately and upon the operation of relay TA1, all other relays LA- and TA- are inhibited from operating. The lockout circuit serves to insure that one, and only one, LA- or TA- relay is operated at a time.

Thus, even though ringing is detected on many lines at the same time, only one of the lines is selected for identification of the calling station associated therewith. All of the other nonselected lines are queued in the ringing state with their associated station's audible and visual ringing signals being inhibited. Typically, this waiting time can be expected to be less than 200 milliseconds. And in a 100 line installation assuming 10 incoming calls per line per hour, the probability of two or more line circuits requesting access to the identifier at the same time is less than 0.002.

Operation of Wideband Switch and Control Circuit

Figure 6:
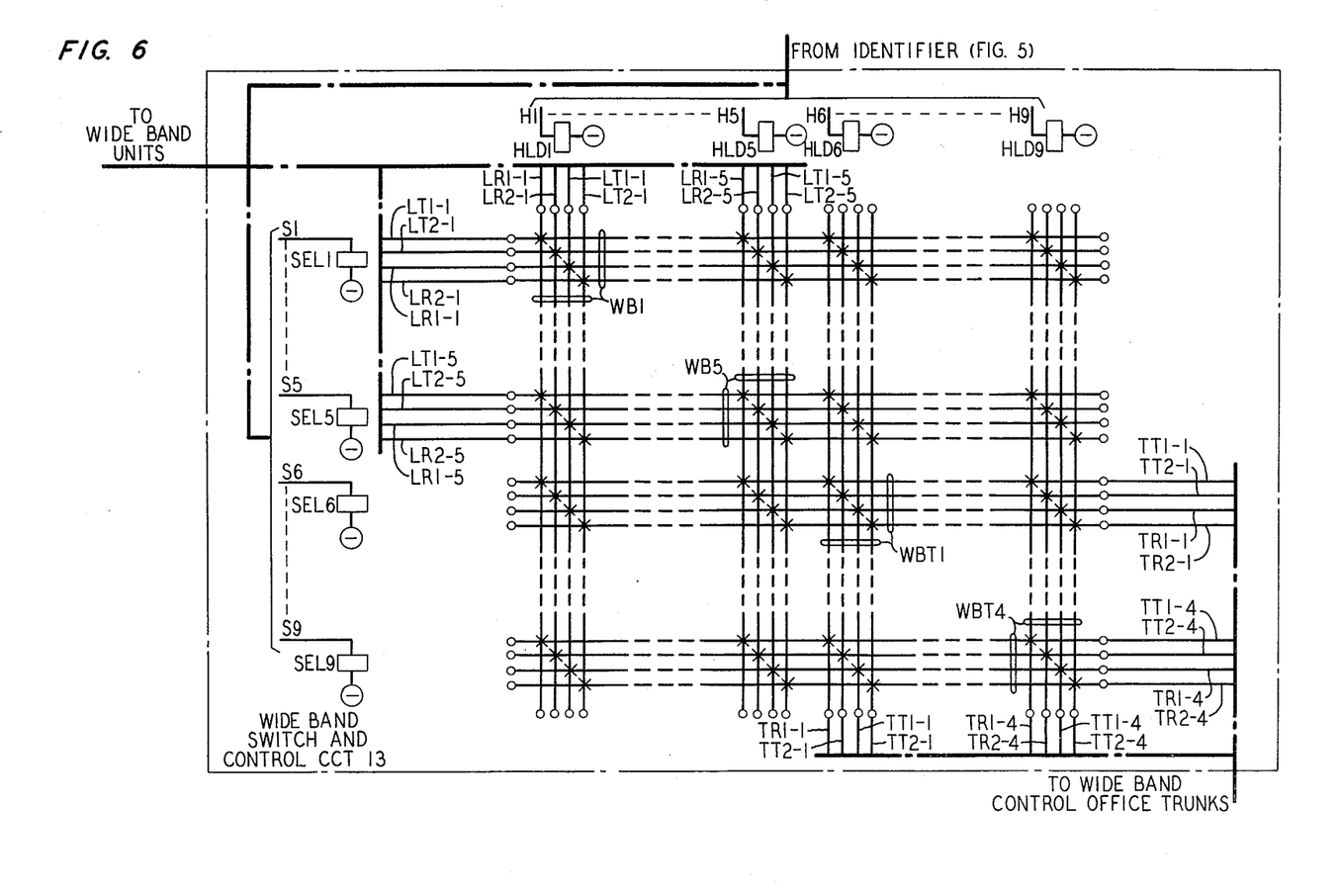

As shown in FIG. 6 wideband switch and control circuit 13 is arranged such that each wideband quad from each station or trunk has an appearance on an individual one of the horizontal rows and vertical columns. For example, the wideband quad from station S1 is associated with horizontal SEL1 and with HLD1 and wideband quad WBT1 (of trunk TC1) is associated with select horizontal SEL6 and with hold vertical HLD6. Thus, if it was desired to establish a wideband connection between the wideband quad of station S1 and the wideband quad of trunk TC1, select magnet SEL1 would be operated together with the operation of hold magnet HLD6. It should be noted that the vertical multiples and the horizontal multiples are reversed from each other so that the transmit pairs are connected through the crosspoints to the receive pairs. The same connection would also be established upon the operation of the select 6 and hold 1. The purpose of this duality is so that any station may be a calling station, in which case its associated hold magnet would operate and any station can be a called station in which case its select magnet would operate. As will be seen, identifier circuit 12 is arranged to cause the operation of the select magnet associated with a selected called line and, upon identification of the calling line currently connected therewith, to operate the hold magnet associated with the identified calling line.

Identification of Called Stations

Returning now to FIG. 5 and continuing with the example where line circuit LC5 is in the ringing state and where relay LA5 in the lockout circuit is operated, ground is provided to an input of gate 50-5 via operated make contact LA5-4. The output of gate 50-5 goes to ground which ground is supplied to the input of gate 54-5. Remembering that line buffer LB5 is associated with a line circuit in the ringing mode, ground is on lead LRG5 and thus the output of gate 54-5 goes to ground thereby providing a ground to one input of gate 66-5 (not shown). Since the other input to gate 66-5 is already at ground, the output of gate 66-5 goes to ground. This ground on lead S5 operates select magnet SEL5 (FIG. 6). This station S5 is the selected called station which is about to have an identification made of the station which has initiated a call thereto.

The purpose for providing a double selection of the called station relay control circuit is to insure that at any one time only one S lead is activated since any number of LRG- leads may have grounds thereon, each indicating that the associated telephone station is being called. However, as discussed above only one LA- or TA- relay can operate at one time and hence ground can appear on only one of the S- leads. Thus, only one of the select magnets of wideband switch 13 can operate at a particular time. The double selection also insures that a false LA- relay operation does not cause the wideband switch to operate falsely.

Identification of Calling Stations

When lockout circuit 11 selects a particular one of the LA- or TA- relays, such as in our example, relay LA5 as the selected called relay, it only remains to determine which one of the stations or incoming trunks is the calling station or trunk. This determination is accomplished under control of identifier 12, FIG. 5, by placing a 5kHz tone via generator 58 through enabled make contact LA5-3 onto the T and R leads associated with the called station. This tone or any other suitable signal is applied as discussed to the T and R leads of the associated called line circuit and is extended over the regular audio telephone communiction leads back through PBX switching machine 10 as shown in FIG. 1 to the line circuit associated with calling station S1 which in our illustrative example is line circuit LC1 (station S1).

Figure 5:
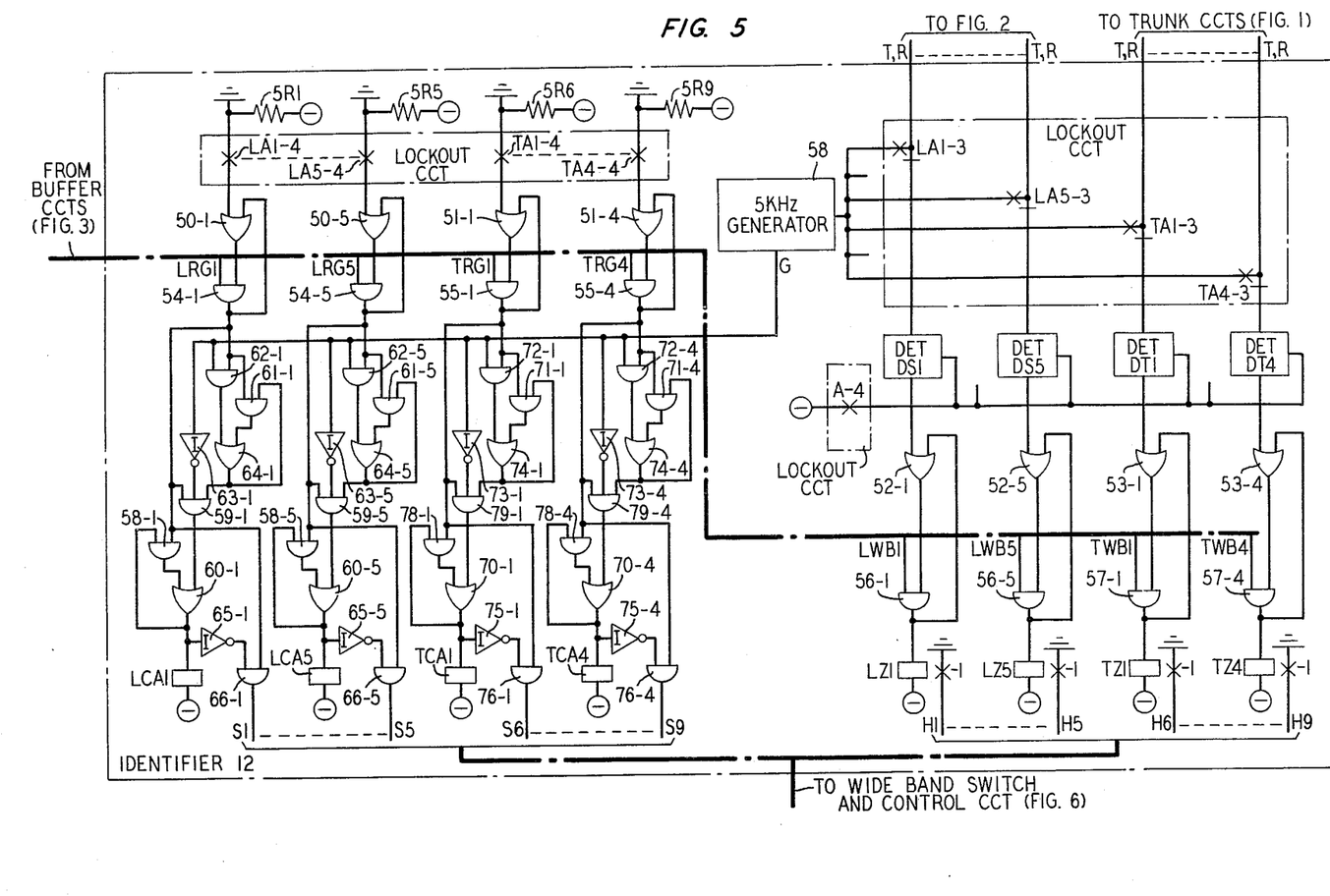

The tone signal which appears on the T and R leads of line circuit LC1 is also extended to identifier circuit 12, FIG. 5, and is extended to detector DETDSI via released break contact LA1-3. Detector circuit DETDS1 is arranged in any one of the well-known circuit configurations to provide a ground signal at the output thereof upon a certain frequency signal being provided to the input. In the embodiment, upon the application of a 5kHz tone to the input of detector DETDS1 the output becomes low momentarily causing the output of gate 52-1 to go to ground thereby placing a ground on one input to gate 56-1. As discussed above, the other input of gate 56-1 is one of the inputs having ground thereon due to its identification as one of the calling lines requesting a wideband connection. Thus the output of gate 56-1 goes to ground operating relay LZ1 and providing a ground on lead H1 to operate hold magnet H1 of wideband switch 13, FIG. 6

The operation of gate 66-5 and relay LZ1 provide grounds on leads S5 and H1, respectively, which grounds are provided to wideband switch and control circuit 13 shown in FIG. 6 thereby operating select magnet SEL5 and hold magnet H1. A crosspoint at the intersection of the horizontal associated with select magnet SEL 5 and the vertical associated with hold magnet HLD1 closes so that the wideband quad associated with horizontal SEL5 is extended from wideband unit WB5 via the wideband quad associated with vertical HLD1 to wideband unit WB1.

Accordingly, a wideband communication path has been established from calling wideband unit WB1 to called wideband unit WB5 under control of an auxiliary wideband switch operated under control of identifier 12 without in any way receiving signals or control information from the PBX switching machine.

When generator 58 is activated, a ground is provided on lead G to gate 62-5 the other input of which is also at ground from gate 54-5. This causes the output of gate 62-5 to go to ground which then causes the output of gates 64-5 and then 61-5 to go to ground. Approximately 200 milliseconds later, when generator 58 is removed, battery is provided on lead G to gate 63-5 which causes the output to go to ground. The grounds on all three inputs to gate 59-5 causes its output to go to ground which then causes the output of gate 60-5 to go to ground thereby operating relay LCA5. The operation of relay LCA5 enables break contact LCA5-1, FIG. 4, which removes ground from relays LL5 and LA5. Relay LA5 releasing causes the release of relay A. If relay Y is unoperated, i.e., if there are no other call requests for identification waiting in the queue, the CO relay releases.

The ground at the output of gate 60-5 causes the output of gate 65-5 to go negative thereby causing the output of gate 66-5 to go negative, also releasing SEL5, FIG. 6. HLD1, however, remains operated under control of lead LWB1.

Thus gates 58-5 through 66-5 insure that SEL5 is held operated only until HLD1 is operated; LCA5 is operated (thereby freeing up the lockout circuit for other users) only after the identification of both the calling and called parties has been effected; and LCA5 and SEL5 do not operate when only the generator is activated.

Extension of Inhibited Calling Signals

As shown in FIG. 3, when the identification process begins with respect to the called station S5, relay LCA5 operates, as discussed, and extends lamp and ringing signals to the called station S5 via enabled make contacts LCA5-3 and LCA5-4. Upon going off-hook in response to these signals the called line circuit (FIG. 2) goes into the busy condition.

The called station going off-hook also causes lead LIR5, FIG. 2, and hence lead LRG5, FIG. 3, to go negative, causing the output of gate 54-5, FIG. 5, to also go negative. This causes the outputs of both gates 58-5 and 59-5 to go negative, and hence gate 60-5 goes negative thereby releasing relay LCA5. This permits line buffer LB5, FIG. 3, to originate a new request for service on the next incoming call to the lockout circuit, FIG. 4

The wideband connection is maintained until the call is terminated and ground is applied to the LC1 lead of line circuit 1, FIG. 2. This causes the output of gate 309-1, FIG. 3, to go negative which causes the output of gate 56-1, FIG. 5, to go negative thereby releasing relay LZ1 which removes ground from lead H1. This releases the wideband connection.

Wideband Connection of Trunk to Station

For the purpose of illustration, let us now assume that a calling (incoming from a distant station) connection is being established from trunk circuit TC1 to station S5, shown in FIG. 1. The T lead of WBT1 will be grounded by the central office as an indication of an incoming call. Within trunk buffer TB1, FIG. 3, high impedance isolation (not shown) is provided between the T and R leads and trunk buffer TB1 by means of any one of the well-known configurations to insure that TB1 does not in any way affect the operation of wideband trunk WBT1. The ground on lead T is provided to one input of gate 342-1. The other input of gate 342-1 is also at ground at this time. Accordingly, the output of gate 342-1 goes to ground causing the output of gate 345-1 to go to ground which in turn causes the output of gate 347-1 to go negative. This causes the output of gate 348-1 to go negative, and since both inputs to gate 326-1 are negative, the output of gate 326-1 goes negative. Since both inputs to gate 324-1 are now negative, its output goes negative causing the output of gate 325-1 to go to ground. This ground is communicated via lead TWB1, to identifier 12 shown in FIG. 5 to one input of gate 57-1 thereby preparing that gate for operation if the other input subsequently has grounded supplied thereto. At this point relay TZ1 associated with wideband trunk WBT1 has been identified for possible subsequent operation. When ringing is applied to line circuit LC5, line buffer LB5 operates in a manner previously described and a ground is provided on lead LRG5 which ground is supplied both to identifier 12, FIG. 5, and to lockout circuit 11, FIG. 4. Accordingly, as shown in FIG. 4, relays LL5 and LA5 operate in the manner previously described. As shown in identifier 12, FIG. 5, the operation of relays LA5 causes tone source 58 to be connected to the T and R leads of the called station S5. Relay SEL5, FIG. 6, also operates at this time in the manner previously described. The tone is transmitted over the calling connection via PBX switch machine 10, FIG. 1, and through trunk circuit TC1 and is communicated to identifier circuit 12 over the T and R leads via released break contact TA1-3 to detector DETDT1. Operation of detector DETDT1 causes the operation of relay TZ1 thereby providing a ground on lead H6. As shown in FIG. 6, a connection is established through the crossbar switch via the crosspoint at the intersection of horizontal SEL5 and vertical HLD6. Thus a wideband connection is established from wideband quad WBT1 associated with trunk circuit TC1 to the wideband quad associated with wideband unit WB5. The wideband connection is maintained until the call is terminated and ground is removed from the T lead of WBT1. This causes the output of gate 325-1, FIG. 3, to go negative which causes the output of gate 57-1, FIG. 5, to go negative thereby releasing relay TZ1 which removes ground from lead H6. This releases the wideband connection.

Wideband Connection of Station to Trunk

For the purpose of illustration, let us now assume that a called (outgoing to a distant station) connection is being established from station S5 to trunk circuit TC1, shown in FIG. 1. When station S5 goes off-hook and operates key P, line buffer LB5 operates in a manner previously described and a ground is provided on lead LWB5 which ground is supplied to identifier 12. FIG. 5, thus preparing the operate path for relay LZ5 should DETDS5 be activated.

Station S5, by transmitting station identification digits over the T and R leads to the PBX switching machine 10, causes the PBX to establish a connection therethrough to an idle wideband trunk circuit which we will assume to be TC1. PBX 10 operates in the well-known manner to establish an audio connection from station S5 to trunk TC1. PBX 10 then applies a ground on the R lead of TC1 as a trunk seizure signal to the central office. The ground on lead R is provided to one input of gate 341-1. The other input of gate 341-1 is also at ground at this time. Accordingly, the output of gate 341-1 goes to ground causing the output of gate 344-1 to go to ground. This ground is communicated via lead TRG1 to lockout circuit, FIG. 4, and to identifier 12, FIG. 5. The central office in response to the ground on the R lead applies a ground to the T lead, which ground is provided to one input of gate 340-1. Since the other input of gate 340-1 is also at ground, the output of gate 340-1 also goes to ground thus insuring that the output of gate 344-1 is maintained at ground until both the grounds on T and R are removed.

The ground on lead TRG1 causes relays TL1 and TA1, FIG. 4, to operate in the manner previously described. As shown in identifier 12, FIG. 5, the operation of relay TA1 causes tone source 58 to be connected to the T and R leads of trunk circuit TC1. Relay SEL6, FIG. 6, also operates at this time in the manner previously described. The tone is transmitted over the connection via PBX switch machine 10, FIG. 1, and through line circuit LC5 and is communicated to identifier circuit 12 over the T and R leads via released break contact LA5-3 to detector DETDS5. Operation of detector DETDS5 causes the operation of relay LZ5 thereby providing a ground on lead H5. As shown in FIG. 6, a connection is established through the crossbar switch via the crosspoint at the intersection of horizontal SEL6 and vertical HLD5. Thus a wideband connection is established from the wideband quad associated with wideband unit WB5 to wideband quad WBT1 associated with trunk circuit TC1.

The wideband connection is maintained until the call is terminated and ground is applied to the LC5 lead of line circuit 5 causing the output of gate 309-5, FIG. 3, not shown, to go negative which causes the output of gate 56-5 to go negative thereby releasing relay LZ5 which removes ground from lead H5. This releases the wideband connection.

Conclusion

While the embodiment shown illustrates both relays and electronics for control purposes, it should be understood that the control circuit, as well as the auxiliary switch network, may consist of all electro-mechanical or all electronic circuitry without regard for the actual type of central switching machine employed. Also, while the invention is shown in a key telephone environment, there is no intent to so limit the invention which could be employed in any type of telephone system. For example, where line circuits are not readily available the actual T and R leads could be routed through the buffer circuit for control purposes.

What is claimed is:

1. In a telephone communication system,
   a plurality of stations,
   a central switching network,
   means for establishing communication connections from a calling one of said stations over a communication line from said calling station through said central switching network and over a communication line from said central switching network to a called one of said stations,
   a second switching network independent from said central switching network, said second switching network arranged to establish second communication connections between calling and called ones of said stations,
   a control circuit for controlling the establishment of connections through said second switching network, said control circuit comprising
   tone supplying means,
   tone detecting means,
   means for associating said tone detecting means with the communication lines of calling ones of said stations,
   first identification means responsive to station ringing signals transmitted from said central switching network over any said communication line to a called one of said stations for identifying said called station,
   means responsive to said identification of a called one of said stations for connecting said tone supplying means to said communication line of said identified called station,
   second identification means controlled by an enabling of said tone detecting means for identifying one of said calling stations as the station connected through said central switching network to said identified called station, and
   means controlled by said first and said second identification means for establishing a said second communication connection through said second switching network between said calling and said called stations.

2. The invention set forth in claim 1 wherein said first identification means includes means for selecting for identification one of said stations having ringing signals transmitted thereto and for queuing all other ones of said stations having ringing signals transmitted thereto.

3. The invention set forth in claim 2 further comprising means associated with each said communication line for inhibiting said ringing signals from being provided to said called station.

4. The invention set forth in claim 3 wherein said first identification means further includes means for extending said ringing signals to a selected one of said called stations.

5. The invention set forth in claim 1 further comprising
   at least one trunk circuit to said central switching network,
   means for establishing communication connections from said trunk circuit through said central switching network to a called one of said stations,
   means for establishing second communication connections through said second switching network from said trunk circuit to a called one of said stations,
   said associating means further operable for associating said tone detecting means with said trunk,
   said second identification means further operable under control of said tone detecting means for identifying said trunk circuit as the circuit connected through said switching network to said called station.

6. The invention set forth in claim 5 wherein said communication connections which are established through said first switching network are audio only communication connections and wherein said second communication connections through said second network are wideband communication connections.

7. The invention set forth in claim 1 further comprising
   a plurality of trunk circuits connected to said central switching network,
   means for establishing communication connections from any of said stations from a calling one of said stations over a communication line from said calling station through said central switching network to an activated one of said trunk circuits,
   means for establishing second communication connections through said second switching network from said calling station to said activated trunk,
   third identification means responsive to called station identification signals being transmitted from said calling station for identifying said activated trunk,
   means responsive to said identification of said activated trunk for connecting said tone supplying means to said identified trunk circuit,
   said second identification means further operable for identifying one of said calling stations as the station connected through said central switching network to said identified trunk circuit, and
   means controlled by said third and second identification means for establishing a second communication connection through said second switching network between said calling station and said identified trunk circuit.

8. In a telephone communication system wherein audio communication connections are established from a calling station to a called station through a central switching network, an arrangement for establishing a secondary communication connection from a calling one of said stations to any called one of said stations, said arrangement comprising a second switching network, means for controlling said second switching network independently from the control of said central switching network, said control means including means for identifying a called one of said stations, means for applying a distinctive signal to the audio connection established through said central switching network from the identified called station, means for detecting said distinctive tone, means for individually connecting said detecting means to the audio connection associated with calling ones of said stations, means controlled by the enabling of said detecting means connected to the calling one of said stations connected to said identified called station for identifying said calling station, and means responsive to the joint identification of said called station and said identified associated station for enabling a connection through said second switching network from said identified calling station to said identified called station.

9. The invention set forth in claim 8 wherein said called station identification means includes means for selecting for identification one of said stations having ringing signals transmitted thereto and for queuing all other ones of said stations having ringing signals transmitted thereto.

10. The invention set forth in claim 8 wherein said second switching network includes means for enabling concurrent secondary connections between calling and called ones of said stations.

* * * * *